Patented Jan. 30, 1934

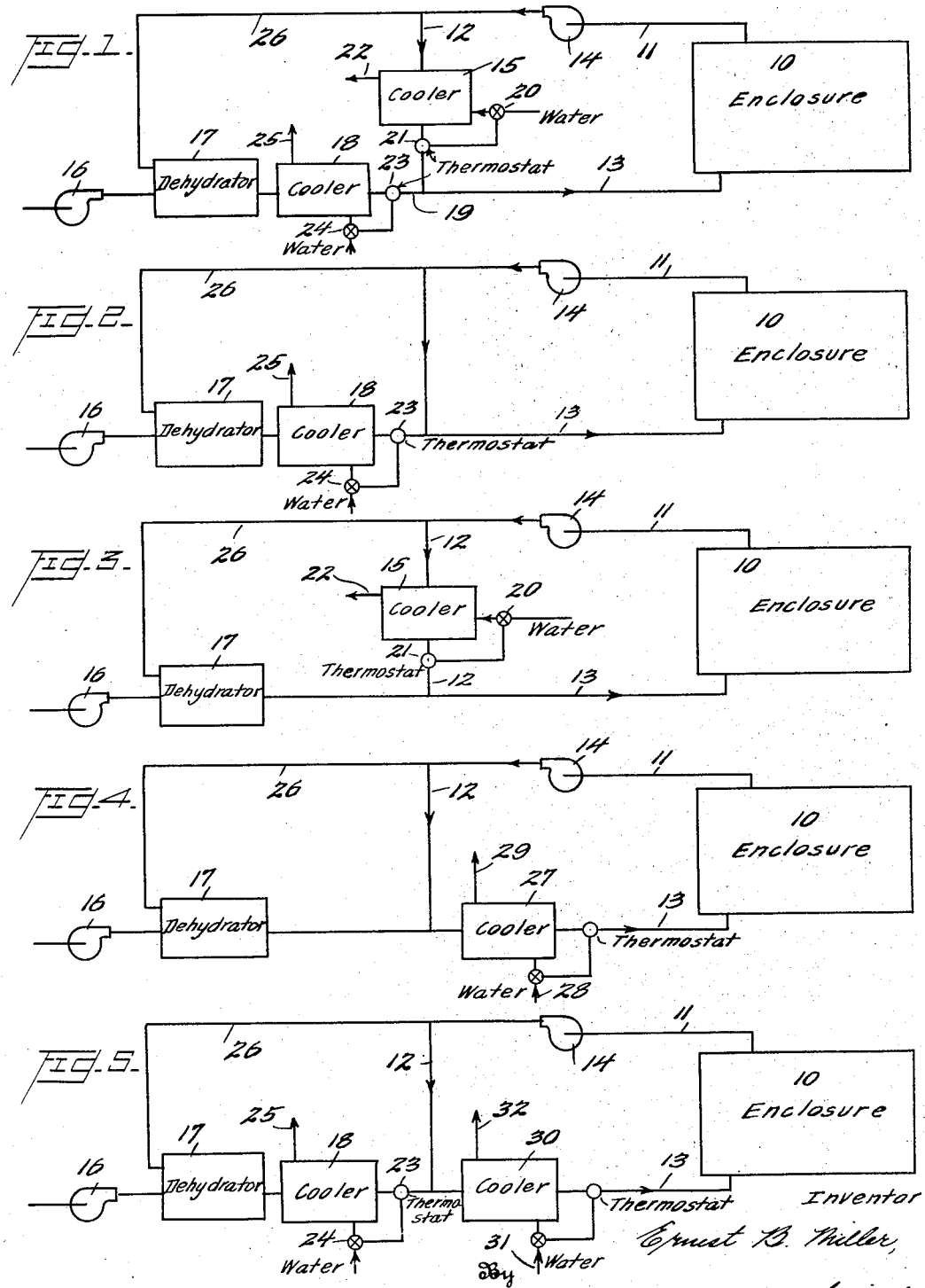

1,945,441

UNITED STATES PATENT OFFICE 1,945,441

AIR CONDITIONING SYSTEM

Ernest Baldwin Miller, Baltimore, Md., assignor, by mesne assignments, to Chester F. Hockley, receiver for The Silica Gel Corporation, Baltimore, Md., a corporation of Maryland Application November 16, 1931
Serial No. 575,402

18 Claims. (Cl. 62—176)

The present invention relates to systems for ventilating and cooling enclosures where people are present in greater or less numbers.

In prior systems it has been customary to automatically control the quantity, relative humidity and temperature of the air supplied to the enclosure. This can be accomplished by controlling the quantity, humidity and temperature of the air taken from the outside and also the quantity of the air that is withdrawn from the enclosure and mixed with the outside air before being supplied to the enclosure.

It is the principal object of the present invention to eliminate the automatic controls as far as possible.

To this end the present system of air conditioning includes one or more of the following features:

1. Air is withdrawn from the enclosure at a constant rate.
2. Outside air is supplied at a constant rate.
3. These two airs are mixed and delivered to the enclosure.
4. At least one of the airs is treated to remove moisture therefrom. Preferably most of the moisture is removed from the air so that the treated air has an unvarying moisture content.
5. At least one of the airs is treated to bring it to such a temperature that the temperature of the air delivered to the enclosure will cause no discomfort to an occupant.
6. The withdrawn air is treated to bring it to an unvarying temperature.
7. The outside air is treated to bring it to an unvarying temperature.
8. The volumes of air withdrawn from the enclosure and supplied from the outside in a given time, and the temperature and relative humidity of the air supplied to the enclosure, are such as to condition the air for the maximum number of persons that will occupy the enclosure at any time regardless of the number present at any instant.
9. Preferably the air supplied to the enclosure is introduced at the lower part thereof.
10. Preferably the air withdrawn from the enclosure is taken from the upper part thereof.

Other objects and features of novelty will be apparent from the following description and drawing, in which:

Figure 1 is a diagrammatic representation of a system of air conditioning in accordance with one form of the present invention; and Figures 2, 3, 4, and 5 are similar views, showing modified systems.

In the systems for ventilating and conditioning the air of enclosures, the primary intent is to provide a comfortable condition for the occupants, and this condition is not solely dependent on any one factor but rather on a combination of dry bulb temperature, relative humidity, rate of movement of the air, and direction of movement of the air. If the relative humidity is maintained at or below about 50%, there can be a considerable variation in the dry bulb temperature without affecting the comfort conditions, and if the rate of air movement is maintained sufficiently high, there can be an even greater increase in temperature and even an increase in relative humidity without causing the room to become uncomfortable.

The present invention provides a simple system for maintaining air conditions within the so-called "comfort range" as briefly defined above, with a minimum of equipment and control apparatus. In designing an installation employing the system of the present invention, the amount of air withdrawn from the enclosure, the amount of outside air supplied, the amount of moisture in the treated air, and the temperature of the air supplied to the enclosure, are such as to give the proper air conditions in the enclosure for the maximum number of persons that will ever occupy the same. The factors just mentioned are not changed or varied even if only a fraction of the maximum number of persons should be present.

Preferably, the conditioned air is supplied to the enclosure at the lower part thereof and the air withdrawn from the enclosure is taken from the upper part. The temperature of the air supplied to the enclosure is such that the air can be introduced at the lower part thereof and will cause no discomfort to the occupants.

Referring to Fig. 1 of the drawing, 10 represents an enclosure which may be a building, room, or auditorium, for instance. Air is withdrawn from the upper part of the enclosure through duct 11. A duct 12 connects the duct 11 with an inlet duct 13. One of these ducts may be provided with a circulating device 14 such as a fan or blower and a cooler 15. This cooler may be of any suitable type but preferably is of the indirect type in which the air comes in contact with pipes cooled by cold water flowing therethrough. In the present arrangement it is preferred that the rate of flow of the air be such that the moisture gain from the people in the auditorium is insufficient to lower the dew point to such a degree that precipitation occurs in the cooler. However, if any precipitation should take place, the resulting water can be removed automatically.

The air is withdrawn from the enclosure at a constant rate, that is to say, the rate of flow of the air in these ducts is unvarying.

In order to maintain a satisfactorily low humidity within the auditorium, fresh air is supplied by a fan or the like 16 to a dehydrator 17. The air leaving the dehydrator may pass through a cooler and be delivered by a duct 19 to the inlet duct 13.

The dehydrating device 17 preferably comprises one or more adsorbers containing a solid porous material capable of removing moisture from the air. Preferably, a material like silica gel is employed which can be revivified by heating so that it can be used over and over. When the moisture is removed with a solid adsorbent like silica gel, the temperature of the air is raised and it is for the purpose of cooling the same that cooler 18 is supplied. This cooler may be of the same construction as cooler 15. The outside air is supplied at a constant rate, that is to say, there is no damper or other device to control the quantity supplied to the system. The dehydrator removes substantially all of the moisture from the air passing therethrough and since the dehydrated air is brought to a constant temperature, as explained hereinafter, it can be said that the relative humidity of the treated outside air is substantially constant.

In order to maintain a constant temperature of the air supplied to the enclosure, a simple thermostatic control may be provided for each cooler. For instance, the valve 20 that controls the supply of cold water to the cooler 15 may be regulated by the thermostat 21 in the duct 12 on the air discharge side of the cooler. The cooling water is discharged through pipe 22. The temperature of the air discharged from the cooler 18 is also preferably maintained constant in a similar manner, a thermostat 23 being provided to control the cooling water inlet valve 24. The cooling water is discharged through pipe 25. The temperatures of the airs discharged from these two coolers may be the same or different but are maintained constant and are such that after being mixed the temperature of the air supplied to the enclosure will not be so low as to cause discomfort when discharged into contact with the occupants of the enclosure in accordance with the upward flow system preferably used with this invention.

It will be noted that the moisture gain within the auditorium is the only factor in connection with humidity which is variable in this system, since the humidity of the air in the conduit 19 is substantially independent of the humidity of the outside air supplied to the dehydrator. Hence, air of substantially constant humidity is supplied to mix with the withdrawn air.

If the particular installation requires that a part of the withdrawn air be conditioned, this can be done by supplying a portion of the withdrawn air to the dehydrator through a conduit 26.

In the system according to Fig. 2, the cooler 15 is omitted and all of the cooling effected by cooler 18.

In the system according to Fig. 3, the cooler 18 is omitted and all of the cooling effected by cooler 15.

In the system according to Fig. 4, all of the cooling is effected by a cooler 27 located in the duct 13. The temperature of the air leaving this cooler is maintained constant by a thermostat which controls the cooling water inlet valve 28, this water leaving the cooler through pipe 29.

In the system according to Fig. 5, two coolers are employed in series. This treated outside air, after being dehydrated, is cooled by means of the cooler 18. Then, after the withdrawn air and treated outside air have been mixed, the mixture is cooled by means of cooler 30, the temperature of the outside air being maintained substantially constant by a thermostat controlling the amount of cooling water furnished through inlet pipe 31 and discharged through pipe 32.

Following are the data of an actual installation according to the present invention:

1. Air is withdrawn from the enclosure at the rate of 19,800 cubic feet per minute.
2. In this particular installation this air is not cooled before being mixed with the dehydrated air.
3. Outside air is supplied at the rate of 3500 cubic feet per minute.
4. The outside air is dehydrated and cooled to 90° F.
5. After being cooled, the relative humidity of this treated air is 2½% (0.37 grains per cubic foot).
6. The mixed air is passed through a cooler where the temperature of the air is reduced so that it is supplied to the enclosure at 76° F.
7. The air is delivered to the enclosure near the floor level and withdrawn near the ceiling.

The term "moisture" as employed in this specification and the claims is intended to include water vapor.

Having thus described the invention, what is claimed as new and desired to be secured by Letters Patent is:

1. The method of conditioning air supplied to an enclosure which consists in mixing two streams of air to form a third stream, one of said streams being supplied from the enclosure at a constant rate, another stream being supplied from outside air at a constant rate, treating the air of at least one of said streams to remove moisture therefrom and treating air of at least one stream to bring it to a fixed temperature such that the temperature of the air delivered to the enclosure will cause no discomfort to an occupant of the enclosure.

2. The method of conditioning air supplied to an enclosure which consists in mixing two streams of air to form a third stream, one of said streams being supplied from the enclosure at a constant rate, another stream being supplied from outside air at a constant rate, treating the air of at least one of said streams to remove moisture therefrom and treating air of at least one stream to bring it to a temperature such that the temperature of the air delivered to the enclosure will cause no discomfort to an occupant of the enclosure; the volume of air withdrawn, the relative humidity of the dehydrated air, and the temperature of the air supplied to the enclosure, being always such as to condition the air for the maximum number of persons that will occupy the enclosure at any time regardless of the number present at any instant.

3. The method according to claim 1, wherein the air of at least one stream is dehydrated to such an extent that the moisture content thereof is substantially constant.

4. The method according to claim 1, wherein the moisture is removed from the outside air to such an extent as to provide air having a constant and low relative humidity.

5. The method according to claim 1, wherein the air is withdrawn for treatment from the upper portion of the enclosure and the conditioned air is supplied to the lower part of the enclosure.

6. The method of conditioning air supplied to an enclosure which consists in mixing constant quantities of air withdrawn from the enclosure with constant quantities of outside air having a substantially unvarying and low relative humidity, and introducing the mixture into the enclosure.

7. The method of conditioning air supplied to an enclosure which includes withdrawing air from the enclosure at a constant rate, cooling said withdrawn air, treating outside air supplied at a constant rate to provide air having a lower dew point than the withdrawn air, mixing the withdrawn and treated airs and delivering the mixture to the enclosure.

8. The method of conditioning air supplied to an enclosure which includes withdrawing air from the enclosure at a constant rate, treating said air to bring it to a predetermined unvarying temperature, treating outside air supplied at a constant rate to remove most of its moisture, bringing said treated air to a predetermined unvarying temperature, mixing said withdrawn and treated airs, and delivering the mixture to the enclosure.

9. The method according to claim 8, wherein the withdrawn air is taken from the upper portion of the enclosure and the conditioned air is supplied to the lower portion of the enclosure.

10. The method of conditioning air supplied to an enclosure which includes withdrawing air from the enclosure at a constant rate, treating outside air supplied at a constant rate to remove most of its moisture, bringing said treated air to a predetermined unvarying temperature, mixing said withdrawn and treated airs, and delivering the mixture to the enclosure.

11. The method of conditioning air supplied to an enclosure which includes withdrawing air from the enclosure at a constant rate, treating said air to bring it to a predetermined unvarying temperature, treating outside air supplied at a constant rate to remove most of its moisture and mixing said withdrawn and treated airs and delivering the mixture to the enclosure.

12. The method of conditioning air supplied to an enclosure which includes withdrawing air from the enclosure at a constant rate, treating outside air supplied at a constant rate to remove most of its moisture, bringing said treated air to a predetermined unvarying temperature, mixing said withdrawn and treated airs, and delivering the mixture to the enclosure.

13. The method of conditioning air supplied to an enclosure which includes withdrawing air from the enclosure at a constant rate, treating outside air supplied at a constant rate to remove most of its moisture, mixing said withdrawn and treated airs, cooling and delivering the mixture to the enclosure.

14. The method of ventilating an enclosure which includes withdrawing air from the enclosure, bringing said withdrawn air to a predetermined fixed temperature, conditioning fresh air to provide air having a dew point lower than the dew point of the withdrawn air and a fixed predetermined temperature, mixing said conditioned fresh air with said withdrawn air, and delivering said mixed air to the enclosure.

15. The method of ventilating an enclosure which includes withdrawing air from said enclosure for recirculation, mixing the withdrawn air with a substantially fixed proportion of fresh outside air which is dehumidified, bringing the mixture of fresh and recirculated air to a predetermined fixed temperature, and delivering the mixture to the enclosure.

16. The method of ventilating an enclosure which includes withdrawing air from the upper portion of said enclosure for recirculation, mixing the withdrawn air with a substantially fixed proportion of fresh outside air which is dehumidified to a substantially fixed degree to provide a mixed air, adjusting the temperature of one of said airs, and delivering the mixture to the enclosure near the bottom thereof at a substantially constant temperature.

17. The method of ventilating a room subject to varying heat and moisture gains which includes continuously withdrawing a constant quantity of air therefrom for recirculation, mixing withdrawn air with such a fixed proportion of outside fresh air which is dehumidified to a fixed degree as to provide in the room substantially the desired relative humidity under conditions of maximum moisture gain, adjusting the temperature of the mixture to a fixed degree, delivering the mixture to the room, and adjusting the volume of air recirculated to produce the desired room temperature under conditions of maximum heat gain.

18. The method of ventilating a room which consists in withdrawing air from the upper part of the room, reducing the temperature of said air to a predetermined degree and delivering it to a lower part of the room, and diluting the delivered air with a substantially fixed proportion of outside air which is dehumidified to a substantially constant absolute humidity.

ERNEST BALDWIN MILLER.